United States Patent
Choi

(10) Patent No.: US 11,674,809 B2
(45) Date of Patent: Jun. 13, 2023

(54) MOVING ROBOT AND CONTROL METHOD THEREOF

(71) Applicant: LG ELECTRONICS INC., Seoul (KR)

(72) Inventor: Jieun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 199 days.

(21) Appl. No.: 16/920,082

(22) Filed: Jul. 2, 2020

(65) Prior Publication Data

US 2021/0003405 A1    Jan. 7, 2021

(30) Foreign Application Priority Data

Jul. 5, 2019   (KR) .................. 10-2019-0081459

(51) Int. Cl.
*G01C 21/32* (2006.01)
*G01S 17/89* (2020.01)
*G05D 1/02* (2020.01)

(52) U.S. Cl.
CPC .............. *G01C 21/32* (2013.01); *G01S 17/89* (2013.01); *G05D 1/0274* (2013.01); *G05D 2201/0215* (2013.01)

(58) Field of Classification Search
CPC ..... G01C 21/32; G01C 21/3837; G01S 17/89; G05D 1/0274; G05D 2201/0215; G05D 2201/0203; G05D 1/0212; B25J 9/1664; B25J 9/0003; B25J 11/0085; B25J 13/08; B25J 19/02

See application file for complete search history.

(56) References Cited

U.S. PATENT DOCUMENTS

| | | | |
|---|---|---|---|
| 5,677,836 A | 10/1997 | Bauer | |
| 5,684,695 A | 11/1997 | Bauer | |
| 5,793,934 A | 8/1998 | Bauer | |
| 8,676,429 B2 | 3/2014 | Nakano et al. | |
| 11,175,670 B2 * | 11/2021 | Artes | .................. G05D 1/0088 |
| 11,288,836 B2 | 3/2022 | Park et al. | |

(Continued)

FOREIGN PATENT DOCUMENTS

| | | |
|---|---|---|
| JP | H06-327599 | 11/1994 |
| JP | 2010-225125 | 10/2010 |

(Continued)

OTHER PUBLICATIONS

Machine Translation: KR-101242252-B1 (Year: 2013).*

(Continued)

*Primary Examiner* — Anne Marie Antonucci
*Assistant Examiner* — Connor L Knight
(74) *Attorney, Agent, or Firm* — Ked & Associates, LLP

(57) ABSTRACT

A method for creating a map by a moving robot includes receiving sensor data regarding a distance to an external object through a distance measurement sensor, and creating a cell-based grid map based on the sensor data. Image processing is performed to distinguish between regions in the grid map and to create a boundary line between the regions. An optimal boundary line is selected from the one or more boundary lines, and a path to the optimal boundary line is planned. The grid map is updated while the moving robot is moving along the path such that the map may be automatically created.

18 Claims, 11 Drawing Sheets

(56) References Cited

U.S. PATENT DOCUMENTS

| | | | |
|---|---|---|---|
| 11,399,687 | B2 | 8/2022 | Cheong |
| 2002/0015521 | A1 | 2/2002 | Kim |
| 2003/0030398 | A1 | 2/2003 | Jacobs et al. |
| 2004/0039498 | A1 | 2/2004 | Ollis et al. |
| 2004/0204792 | A1 | 10/2004 | Taylor et al. |
| 2005/0000543 | A1 | 1/2005 | Taylor et al. |
| 2005/0010331 | A1 | 1/2005 | Taylor et al. |
| 2005/0273967 | A1 | 12/2005 | Taylor et al. |
| 2006/0020369 | A1 | 1/2006 | Taylor et al. |
| 2007/0061043 | A1 | 3/2007 | Ermakov et al. |
| 2008/0273791 | A1 | 11/2008 | Lee et al. |
| 2009/0281661 | A1 | 11/2009 | Dooley et al. |
| 2010/0070078 | A1* | 3/2010 | Kong ............ G05D 1/0274 901/1 |
| 2010/0324731 | A1 | 12/2010 | Letsky |
| 2010/0328457 | A1 | 12/2010 | Lee |
| 2011/0137461 | A1* | 6/2011 | Kong ............ G05D 1/0274 901/1 |
| 2012/0106829 | A1 | 5/2012 | Lee et al. |
| 2012/0143372 | A1 | 6/2012 | Roh |
| 2013/0138247 | A1 | 5/2013 | Gutmann et al. |
| 2014/0009748 | A1 | 1/2014 | Leonessa et al. |
| 2014/0142891 | A1 | 5/2014 | Lucidarme et al. |
| 2015/0242806 | A1 | 8/2015 | Cousins et al. |
| 2016/0005229 | A1 | 1/2016 | Lee et al. |
| 2016/0069691 | A1 | 3/2016 | Fong et al. |
| 2016/0132056 | A1 | 5/2016 | Yoshino |
| 2016/0167226 | A1 | 6/2016 | Schnittman |
| 2016/0302638 | A1 | 10/2016 | Haegermarck |
| 2017/0239813 | A1* | 8/2017 | Vicenti ............ G05D 1/0272 |
| 2018/0177361 | A1 | 6/2018 | Song et al. |
| 2018/0239355 | A1 | 8/2018 | Lee et al. |
| 2018/0267552 | A1 | 9/2018 | Artes et al. |
| 2018/0289228 | A1 | 10/2018 | Xue et al. |
| 2018/0296049 | A1 | 10/2018 | Izawa et al. |
| 2018/0306587 | A1 | 10/2018 | Holz |
| 2018/0314254 | A1 | 11/2018 | Bauer et al. |
| 2018/0361583 | A1 | 12/2018 | Williams et al. |
| 2019/0011929 | A1 | 1/2019 | Maeno |
| 2019/0025838 | A1* | 1/2019 | Artes ............ G05D 1/0044 |
| 2019/0035100 | A1 | 1/2019 | Ebrahimi Afrouzi et al. |
| 2019/0061157 | A1 | 2/2019 | Suvarna et al. |
| 2019/0090712 | A1 | 3/2019 | Cheong |
| 2019/0094869 | A1 | 3/2019 | Artes et al. |
| 2019/0094870 | A1 | 3/2019 | Afrouzi et al. |
| 2019/0113927 | A1 | 4/2019 | Englard et al. |
| 2019/0220020 | A1 | 7/2019 | Macias et al. |
| 2019/0310653 | A1 | 10/2019 | Lee et al. |
| 2019/0332121 | A1 | 10/2019 | Kim et al. |
| 2019/0339703 | A1 | 11/2019 | Bao et al. |
| 2020/0393545 | A1* | 12/2020 | Shani ............ G01S 17/894 |
| 2021/0048312 | A1 | 2/2021 | Choi et al. |
| 2022/0137637 | A1 | 5/2022 | Baldini et al. |

FOREIGN PATENT DOCUMENTS

| | | |
|---|---|---|
| JP | 2012-011200 | 1/2012 |
| JP | 2014-123200 | 7/2014 |
| JP | 2019-505256 | 2/2019 |
| KR | 10-0611328 | 8/2006 |
| KR | 10-0715609 | 5/2007 |
| KR | 10-0791384 | 1/2008 |
| KR | 10-2010-0031878 | 3/2010 |
| KR | 10-2010-0070582 | 6/2010 |
| KR | 10-2011-0000848 | 1/2011 |
| KR | 10-2012-0047137 | 5/2012 |
| KR | 10-1179075 | 9/2012 |
| KR | 10-1242252 | 3/2013 |
| KR | 10-2013-0112507 | 10/2013 |
| KR | 10-2014-0009737 | 1/2014 |
| KR | 10-1427186 | 8/2014 |
| KR | 10-1553654 | 10/2015 |
| KR | 10-2016-0036008 | 4/2016 |
| KR | 10-2018-0074537 | 7/2018 |
| KR | 10-2018-0082264 | 7/2018 |
| KR | 10-2019-0103511 | 9/2019 |
| WO | WO 2018/043180 | 3/2018 |
| WO | WO 2019/080679 | 5/2019 |

OTHER PUBLICATIONS

International Search Report dated Oct. 30, 2020 issued in International Application No. PCT/KR2020/008724.
International Search Report dated Dec. 23, 2020 issued in International Application No. PCT/KR2020/009343.
International Search Report dated Dec. 23, 2020 issued in International Application No. PCT/KR2020/008715.
Korean Notice of Allowance dated May 29, 2021 issued in KR Application No. 10-2019-0083998.
International Search Report dated Jan. 8, 2021 issued in International Application No. PCT/KR2020/009048.
United States Office Action dated Jul. 15, 2022 issued in co-pending related U.S. Appl. No. 16/921,167.
United States Office Action dated Aug. 18, 2022 issued in co-pending related U.S. Appl. No. 16/929,423.
United States Office Action dated Sep. 1, 2022 issued in co-pending related U.S. Appl. No. 16/925,798.
United States Office Action dated Sep. 2, 2022 issued in co-pending related U.S. Appl. No. 16/924,848.
United States Office Action dated Dec. 2, 2022 issued in co-pending related U.S. Appl. No. 16/929,423.
U.S. Appl. No. 16/920,082, filed Jul. 2, 2020.
U.S. Appl. No. 16/921,167, filed Jul. 6, 2020.
U.S. Appl. No. 16/925,798, filed Jul. 10, 2020.
U.S. Appl. No. 16/924,848, filed Jul. 9, 2020.
U.S. Appl. No. 16/929,423, filed Jul. 15, 2020.
Japanese Office Action dated Feb. 21, 2023 issued in JP Application No. 2022-500912.

* cited by examiner

MOVING ROBOT AND CONTROL METHOD THEREOF

CROSS-REFERENCE TO RELATED APPLICATION

This application claims priority under 35 U.S.C. § 119 to Korean Application No. 10-2019-0081459 filed on Jul. 5, 2019, whose entire disclosure is hereby incorporated by reference. This application is also related to application Ser. No. 16/921,167 filed Jul. 6, 2020, application Ser. No. 16/925,798 filed Jul. 10, 2020, application Ser. No. 16/924,848 filed Jul. 9, 2020, and application Ser. No. 16/929,423 filed Jul. 15, 2020, whose entire disclosures are also hereby incorporated by reference.

BACKGROUND

1. Field

The present disclosure relates to a moving robot and a control method thereof, and more particularly, to a technique in which a moving robot automatically generates a map.

2. Background

Robots have been developed for industrial use and have been in charge of part of factory automation. In recent years, robot-applied fields have further expanded to develop medical robots, aerospace robots, and the like, and home robots that may be used in general homes have also been made. Among these robots, a robot capable of traveling by itself is called a moving robot.

A typical example of a moving robot used at home is a robot vacuum cleaner, which is a machine that cleans a certain region by intaking dust or foreign matter, while traveling in the corresponding region by itself.

The moving robot, which can be movable by itself, moves freely and has a plurality of sensors for avoiding obstacles and the like during traveling, and thus it is possible to travel by avoiding obstacles.

In order to perform a predetermined operation such as cleaning, it is necessary to accurately generate a map of a traveling zone and to accurately recognize a current location of the moving robot on the map to move to a certain location in the traveling zone.

To recognize a current location of the moving robot, various methods of continuously recognizing the current location based on traveling information (information on a movement direction and a movement speed or comparison between continuously captured bottom images, etc.) at an immediately previous location during a continuous movement of the moving robot, etc. Have been studied. In addition, research into various methods for a moving robot to generate and learn a map on its own has been conducted.

Related art document (Korean Patent Laid-Open Publication No. 10-2010-0031878, Publication date: Mar. 25, 2010) is an invention relating to a map configuring apparatus and method for accurately creating a feature point map and an obstacle map. This document discloses a technique for creating a path based on uncertainty of locations of feature points extracted from an image acquired when a moving robot searches for an unknown environment and traveling according to the created path. The path based on the uncertainty of the feature points is created to increase accuracy of the feature point map of the moving robot or to increase the accuracy of self-location recognition.

However, a search path is created by extracting feature points, and here, uncertainty of a specific environment with few features may be high regardless of whether or not the corresponding region is searched, leading to a problem that the same region is continuously searched.

In addition, in the case of search traveling using an existing grid map, there is a problem in that a boundary between an empty region searched using points with high uncertainty as feature points and an unsearched region cannot be accurately extracted.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings. The present disclosure may, however, be embodied in many alternate forms and should not be construed as limited to the embodiments set forth herein.

In the following description, usage of suffixes such as "module", "part" or "unit" used for referring to elements is given merely to facilitate explanation of the present disclosure, without having any significant meaning by itself. Therefore, the "module" or "part" or "unit" may be used in combination.

Further, in this disclosure, terms such as first, second, etc. may be used to describe various elements, but these elements are not limited by these terms. These terms are only used to distinguish one element from another.

A moving robot 100 according to an embodiment of the present disclosure refers to a robot capable of moving on its own using a wheel or the like, and may be a home helper robot and a robot cleaner. Hereinafter, a robot cleaner having a cleaning function among moving robots will be described as an example, but the present disclosure is not limited thereto.

FIGS. 1A to 1D are views illustrating external appearances of a moving robot and a charging stand that charges a moving robot according to an embodiment of the present disclosure.

Figure 1A:
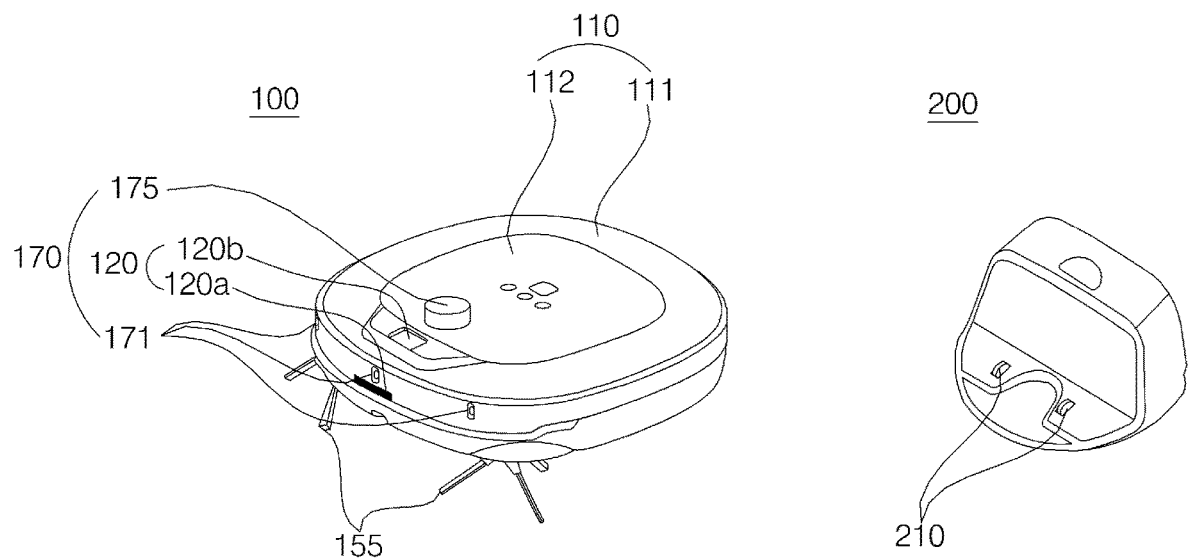
FIGS. 1A to 1D are views illustrating appearances of a moving root and a charging stand that charges a moving robot according to an embodiment of the present disclosure.
Figure 1B:
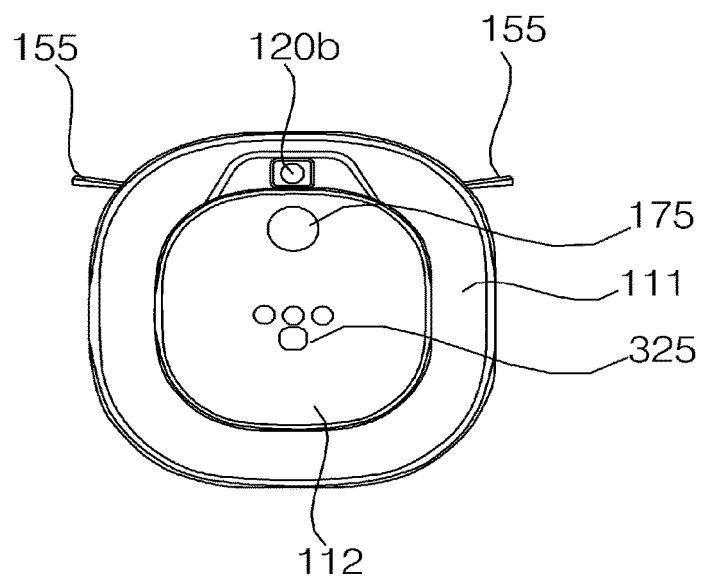
Figure 1C:
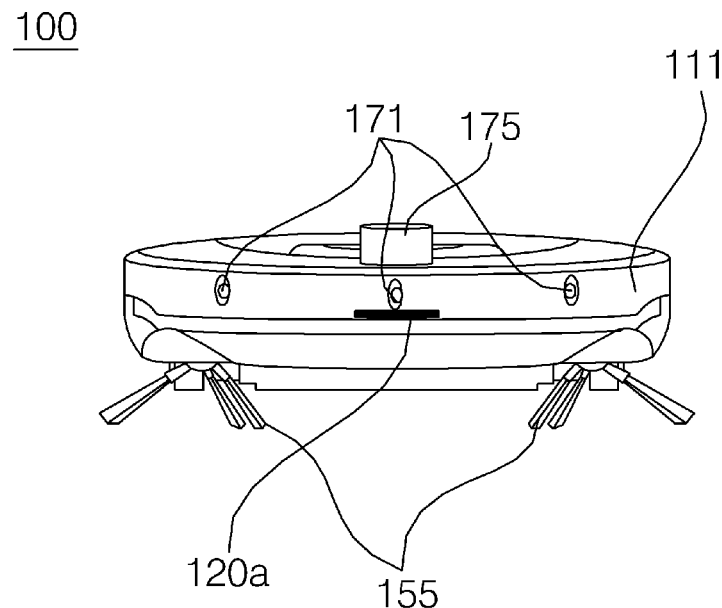
Figure 1D:
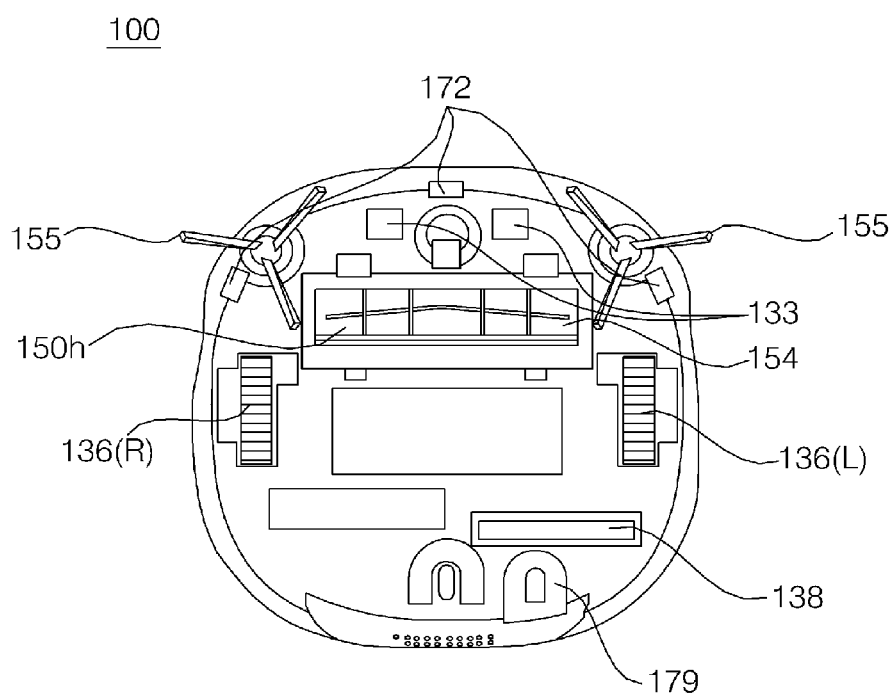

FIG. 1A is a perspective view showing a moving robot and a charging stand that charges a moving robot according to an embodiment of the present disclosure. FIG. 1B is a view showing an upper portion of the moving robot shown in FIG. 1A, FIG. 1C is a view showing a front portion of the moving robot shown in FIG. 1A, and FIG. 1D is a view showing a bottom portion of the moving robot shown in FIG. 1A.

Figure 2:
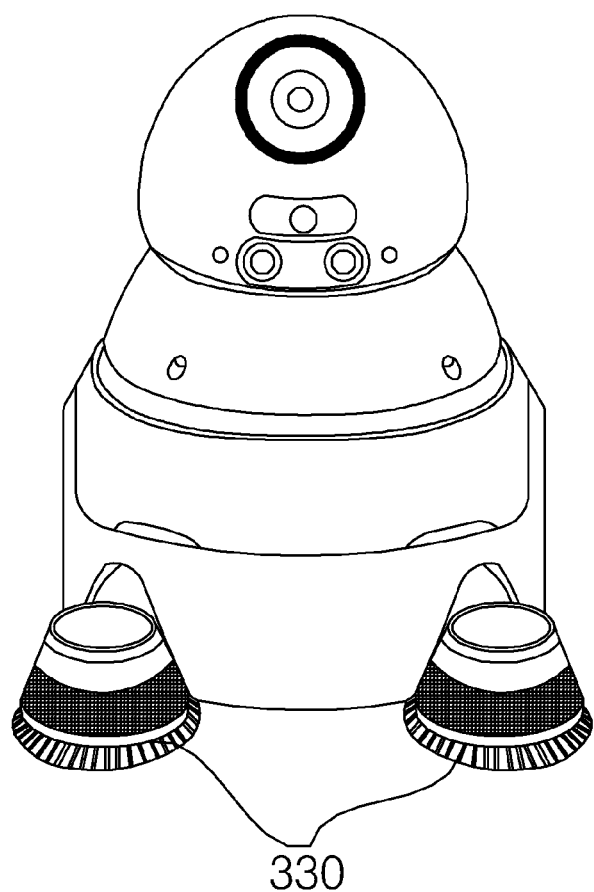
FIG. 2 is a view showing another form of a moving robot according to an embodiment of the present disclosure.

FIG. 2 is a view showing another form of a moving robot according to an embodiment of the present disclosure.

Referring to FIG. 2, a moving robot 100 may have a shape as shown in FIG. 1A or a shape as shown in FIG. 2. The moving robot 100 may have any other forms not shown.

Figure 3:
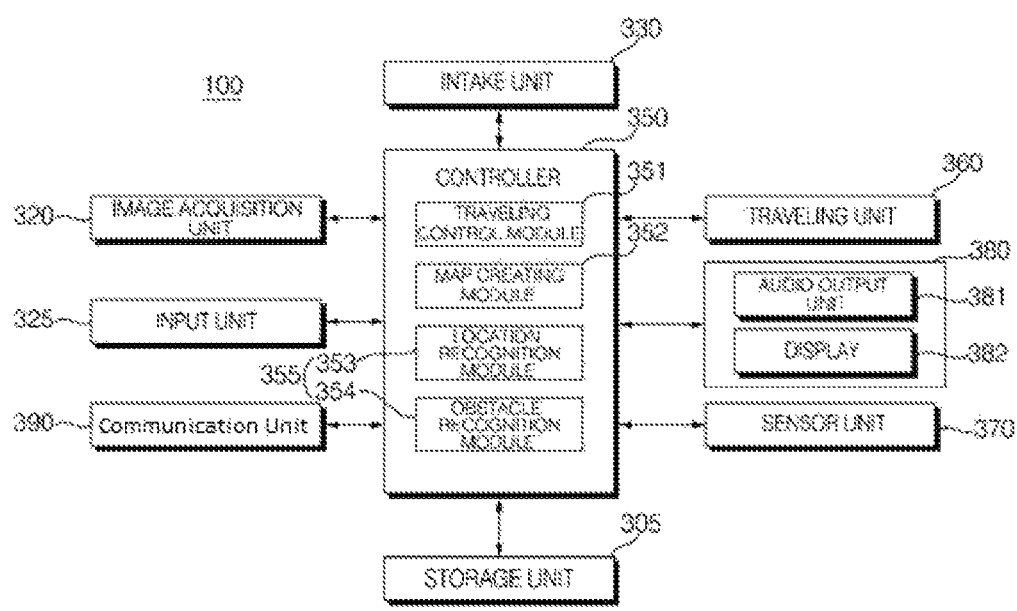
FIG. 3 is a block diagram showing a control relationship between main components of a moving robot according to an embodiment of the present disclosure.

FIG. 3 is a block diagram showing a control relationship between main components of a moving robot according to an embodiment of the present disclosure.

Referring to FIGS. 1 and 3, the moving robot 100 includes a traveling unit 360 that moves a main body 110. The traveling unit 360 includes at least one wheel unit 136 that moves the main body 110. The traveling unit 360 includes a driving motor connected to the wheel unit 136 to rotate a driving wheel. For example, the wheel units 136 may be provided on the left and right of the main body 110, respectively, and are referred to as a left wheel 136(L) and a right wheel 136(R) hereinafter.

The left wheel 136(L) and the right wheel 136(R) may be driven by one driving motor, but if necessary, a left-wheel driving motor for driving the left wheel 136(L) and a right-wheel driving motor for driving the right wheel 136(R) may be provided, separately. A traveling direction of the main body 110 may be switched to the left or right by making a difference in rotational speeds of the left wheel 136(L) and the right wheel 136(R).

An intake port 150h in which air is intaken may be provided on a bottom surface of the main body 110, and an intaking unit 330 providing a suction force to allow air to be intaken through the intake port 150h and a dust bin collecting dust intaken together with air through the intake port 150h may be provided in the main body 110.

The main body 110 may include, for example, a case 111 forming a space in which various components configuring the moving robot 100 are accommodated. An opening for insertion and removal of the dust bin may be provided in the case 111, and a dust bin cover 112 that opens and closes the opening may be provided to be rotatable with respect to the case 111.

The moving robot 100 may include, for example, a roll-type main brush 154 having brushes exposed through the intake port 150h and an auxiliary brush 155 located on a front side of the bottom surface of the main body 110 and having a brush including a plurality of radially extended wings. Dust is separated from a floor in a traveling zone by rotation of these brushes 154 and 155, and the dust separated from the floor may be intaken through the intake port 150h and collected into the dust bin.

The battery 138 supplies power required for the overall operation of the moving robot 100 as well as the driving motor. When the battery 138 is discharged, the moving robot 100 may perform traveling to return to a charging stand 200 for charging. During such return traveling, the moving robot 100 itself may detect a location of the charging stand 200.

The charging stand 200 may include, for example, a signal transmission unit that transmits a predetermined return signal. The return signal may be an ultrasonic signal or an infrared signal, but is not limited thereto.

The moving robot 100 may include a signal detection unit that receives a return signal. The charging stand 200 may transmit an infrared signal through the signal transmission unit, and the signal detection unit may include an infrared sensor that detects the infrared signal. The moving robot 100 moves to a location of the charging stand 200 according to the infrared signal transmitted from the charging stand 200 and docks to the charging stand 200. Charging is performed between the charging terminal 133 of the moving robot 100 and the charging terminal 210 of the charging stand 200 by the docking.

The moving robot 100 may include a sensor unit 170 or 370 that senses information inside/outside the moving robot 100.

For example, the sensor unit 370 may include one or more sensors 171 and 175 for detecting various information on the traveling zone and an image acquisition unit 320 for acquiring image information on the traveling zone. According to an embodiment, the image acquisition unit 320 may be separately provided outside the sensor unit 370.

The moving robot 100 may map a traveling zone through information sensed by the sensor unit 370. For example, the moving robot 100 may perform vision-based location recognition and map creation based on a ceiling image of the traveling zone acquired by the image acquisition unit 320. In addition, the moving robot 100 may perform location recognition and map creation based on a light detection and ranging (LiDAR) sensor 175 using a laser.

More preferably, the moving robot 100 according to the present disclosure may perform location recognition and map creation robust to a change in an environment such as a change in illumination, a change in a location of an article, and the like by effectively fusing vision-based location recognition using a camera and LiDAR-based location recognition technology using a laser.

Meanwhile, the image acquisition unit 320 photographs a traveling zone and may include one or more camera sensors that acquire images outside the main body 110.

In addition, the image acquisition unit 320 may include, for example, a digital camera. The digital camera may include an image sensor (e.g., a CMOS image sensor) including at least one optical lens and a plurality of photodiodes (e.g., pixels) on which an image is formed by light passing through the optical lens and a digital signal processor (DSP) that configures an image based on a signal output from the photodiodes. The DSP may create a still image as well as a moving image composed of frames including still images.

In the present embodiment, the image acquisition unit 320 includes a front camera sensor 120a provided to acquire an image of a front of the main body 110 and an upper camera sensor 120b provided on an upper portion of the main body 110 to acquire an image of a ceiling in the traveling zone, but a location and a photographing range of the image acquisition unit 320 are not necessarily limited thereto.

For example, the moving robot 100 may include only the upper camera sensor 120b that acquires an image of the ceiling in the traveling zone and perform vision-based location recognition and traveling.

Alternatively, the image acquisition unit 320 of the moving robot 100 according to an embodiment of the present disclosure may include a camera sensor disposed to be inclined with respect to one surface of the main body 110 and photograph a front side and an upper side together. That is, both the front side and the upper side may be photographed by one camera sensor. In this case, the controller 350 may separate a front image and an upper image from the image acquired by the camera based on an angle of view. The separated front image may be used for vision-based object recognition together with an image acquired by the front camera sensor 120a. In addition, the separated upper image may be used for vision-based location recognition and traveling together with the image acquired by the upper camera sensor 120b.

The moving robot 100 according to the present disclosure may perform a vision slam of recognizing a current location by comparing surrounding images with pre-stored information based on images or comparing acquired images.

Meanwhile, the image acquisition unit 320 may include a plurality of front camera sensors 120a and/or upper camera sensors 120b. Alternatively, the image acquisition unit 320 may include a plurality of camera sensors configured to photograph the front side and the upper side together.

In the present embodiment, a camera is installed on a part of the moving robot (e.g., front, rear, bottom), and a captured image may be continuously acquired during cleaning. For photographing efficiency, several such cameras may be installed at each part. The image captured by the camera may be used to recognize a type of material, such as dust, hair, floor, etc. present in the corresponding space, whether cleaning was performed, or a cleaning time.

The front camera sensor 120a may photograph a situation of an obstacle existing on the front of the traveling direction of the moving robot 100 or a cleaning region.

According to an embodiment of the present disclosure, the image acquisition unit 320 may acquire a plurality of images by continuously photographing the surroundings of the main body 110, and the plurality of acquired images may be stored in the storage unit 305.

The moving robot 100 may increase accuracy of obstacle recognition by using a plurality of images or increase the accuracy of obstacle recognition by using effective data by selecting one or more of the plurality of images.

The sensor unit 370 may include a distance measurement sensor that measures a distance to an object outside the main body 110. The distance measurement sensor may include a LiDAR sensor 175 that acquires information on geometry outside the main body 110. Hereinafter, the present disclosure may be understood based on the LiDAR sensor 175.

The LiDAR sensor 175 may output a laser to provide information such as a distance to an object that reflects the laser and a location, a direction, and a material of the object and may acquire geometry information of a traveling zone. The moving robot 100 may acquire 360-degree geometry information using the LiDAR sensor 175.

The moving robot 100 according to an embodiment of the present disclosure may create a map by recognizing the LiDAR data such as distance, location, and direction of objects sensed by the LiDAR sensor 175. The map may be a cell-based grid map based on the LiDAR data.

The moving robot 100 according to an embodiment of the present disclosure may acquire geometry information of the traveling zone by analyzing a laser reception pattern such as a time difference or signal strength of the laser reflected and received from the outside. In addition, the moving robot 100 may generate a map using the geometry information acquired through the LiDAR sensor 175.

For example, the moving robot 100 according to the present disclosure may perform LiDAR slam to recognize a current location by comparing surrounding geometry information acquired from the current location through the LiDAR sensor 175 with LiDAR sensor-based pre-stored geometry information or comparing pieces of acquired geometry information.

More preferably, the moving robot 100 according to the present disclosure may perform location recognition and map creation robust to a change in an environment such as a change in illumination, a change in a location of an article, and the like by effectively fusing vision-based location recognition using a camera and LiDAR-based location recognition technology using a laser.

Meanwhile, the sensor unit 370 may include sensors 171, 172, and 179 for sensing various data related to the operation and state of the moving robot.

For example, the sensor unit 370 may include an obstacle detection sensor 171 that detects an obstacle on a front side. In addition, the sensor unit 370 may further include a cliff detection sensor 172 that detects the presence of a cliff on the floor in the traveling zone and a lower camera sensor 179 that acquires an image of the floor.

Referring to FIGS. 1A and 1C, the obstacle detection sensor 171 may include a plurality of sensors installed at regular intervals on an outer circumferential surface of the moving robot 100.

The obstacle detection sensor 171 may include an infrared sensor, an ultrasonic sensor, an RGBD sensor, a bumper sensor, an RF sensor, a geomagnetic sensor, a location sensitive device (PSD) sensor, and the like.

Meanwhile, a location and type of the sensors included in the obstacle detection sensor 171 may vary depending on the type of moving robot, and the obstacle detection sensor 171 may include more various sensors.

The obstacle detection sensor 171 is a sensor that detects a distance to an indoor wall or an obstacle, and in the present disclosure, the obstacle detection sensor 171 is not limited in type but an ultrasonic sensor will be described as an example.

The obstacle detection sensor 171 detects an object, in particular, an obstacle, present in the traveling (movement) direction of the moving robot and transmits obstacle information to the controller 350. That is, the obstacle detection sensor 171 may detect a movement passage of the moving robot, a projecting object present on the front or side of the moving robot, furniture, a wall surface, a wall edge, and the like of a house and transfer corresponding information to the controller 350.

Here, the controller 350 may detect a location of the obstacle based on at least two or more signals received through the ultrasonic sensor, and control movement of the moving robot 100 according to the detected location of the obstacle.

According to an embodiment, the obstacle detection sensor 171 provided on the outer surface of the case may include a transmitter and a receiver.

For example, the ultrasonic sensor may be provided such that at least one transmitter and at least two receivers stagger. Accordingly, signals may be radiated at various angles, and signals reflected from obstacles may be received at various angles.

According to an embodiment, the signal received from the obstacle detection sensor 171 may be subjected to a signal processing process such as amplification or filtering, and then a distance to and direction of the obstacle may be calculated.

Referring to FIG. 3, the image acquisition unit 320 photographs a traveling zone and may include a camera module. The camera may photograph a situation of an obstacle existing in front of the traveling direction of the moving robot 100 or a cleaning region.

According to an embodiment of the present disclosure, the image acquisition unit 320 may acquire a plurality of images by continuously photographing the surroundings of the main body 110, and the acquired plurality of images may be stored in the storage unit 305.

The moving robot 100 may increase accuracy of spatial recognition, location recognition, and obstacle recognition by using a plurality of images or increase spatial recognition, location recognition, and obstacle recognition by using effective data by selecting one or more of a plurality of images.

In addition, the moving robot 100 may include a sensor unit 370 including sensors that sense various data related to the operation and state of the moving robot.

For example, the sensor unit 370 may include an obstacle detection sensor that detects an obstacle on the front side. In addition, the sensor unit 370 may further include a cliff detection sensor that detects the presence of a cliff on the floor in the traveling zone and a lower camera sensor that acquires an image of the floor.

The obstacle detection sensor may include various types of sensors. For example, it may include a LiDAR sensor, an ultrasonic sensor, an RGBD sensor, and a bumper sensor. In this case, the LiDAR sensor may be given priority to acquire sensor data, and obstacle information such as short-range obstacle information or obstacle information such as glass that cannot be detected by the LiDAR sensor may be detected through a bumper sensor or an ultrasonic sensor.

Meanwhile, the location and type of the sensors included in the obstacle detection sensor may vary depending on the type of moving robot, and the obstacle detection sensor may include more various sensors.

Meanwhile, the sensor unit 370 may further include a traveling detection sensor that detects a traveling operation of the moving robot 100 according to driving of the main body 110 and outputs operation information. As the traveling detection sensor, a gyro sensor, a wheel sensor, an acceleration sensor, or the like may be used.

The gyro sensor detects a rotation direction and detects a rotation angle when the moving robot 100 moves according to an operation mode. The gyro sensor detects an angular velocity of the moving robot 100 and outputs a voltage value proportional to the angular velocity. The controller 350 calculates a rotation direction and a rotation angle using a voltage value output from the gyro sensor.

The wheel sensor is connected to the wheel unit 136 to detect the number of revolutions of the wheel. Here, the wheel sensor may be an encoder.

The controller 350 may calculate a rotational speed of left and right wheels using the number of revolutions. In addition, the controller 350 may calculate a rotation angle using a difference in the number of revolutions of the left and right wheels.

The acceleration sensor detects a change in speed of the moving robot 100, for example, a change in the moving robot 100 due to departure, stop, change of direction, collision with an object, and the like.

In addition, the acceleration sensor may be embedded in the controller 350 to detect a change in speed of the moving robot 100.

The controller 350 may calculate a change in location of the moving robot 100 based on operation information output from the traveling detection sensor. The location is a relative location to correspond to an absolute location using image information. The moving robot may improve performance of location recognition using image information and obstacle information through such relative location recognition.

Meanwhile, the moving robot 100 may include a power supply unit having a rechargeable battery to supply power to the moving robot.

The power supply unit supplies driving power and operating power to each component of the moving robot 100, and when a remaining power is insufficient, the power supply unit may be charged by power received from the charging stand 200.

The moving robot 100 may further include a battery detection unit that detects a state of charge of the battery and transmits a detection result to the controller 350. The battery is connected to the battery detection unit so that a remaining battery capacity and a charge status are transmitted to the controller 350. The remaining battery capacity may be displayed on a display 382 of the output unit 380.

In addition, the moving robot 100 includes an input unit 325 for inputting on/off or various commands. The input unit 325 may include a button, a dial, and a touch screen. The input unit 325 may include a microphone for receiving a user's voice instruction. Various control commands necessary for the overall operation of the moving robot 100 may be received through the input unit 325.

According to the present embodiment, the moving robot 100 may receive a user's input for a weight of first information of environmental information and second information of distance information through the input unit. Upon receiving the input signal for the weight, the controller 350 may calculate a cost value. Details of cost values and weights will be described with reference to FIG. 7 below.

In addition, the moving robot 100 may include an output unit 380 and display reservation information, battery status, operation mode, operation status, error status, etc. as an image or output a sound.

The output unit 380 may include an audio output unit 381 that outputs an audio signal. The audio output unit 381 may output a warning message such as a warning sound, an operation mode, an operation state, or an error state as sound under the control of the controller 350. The audio output unit 381 may convert an electrical signal from the controller 350 into an audio signal and output the converted audio signal. To this end, a speaker or the like may be provided.

In addition, the output unit 380 may further include a display 382 for displaying reservation information, battery status, operation mode, operation status, error status, and the like as an image.

Referring to FIG. 3, the moving robot 100 includes the controller 350 for processing and determining various information such as recognizing a current location, and a storage unit 305 for storing various data. In addition, the moving robot 100 may further include a communication unit 390 that transmits and receives data to and from an external terminal.

The external terminal has an application for controlling the moving robot 100, displays a map for a traveling zone to be cleaned through execution of the application, and designate a region to clean a specific region on the map. The external terminal may be, for example, a remote controller, PDA, laptop, smartphone, or tablet equipped with an application for setting a map.

The external terminal may communicate with the moving robot 100, display the current location of the moving robot with a map, and display information on a plurality of regions. In addition, the external terminal updates and displays a location of the moving robot according to movement of the moving robot.

The controller 350 controls the image acquisition unit 320, the input unit 325, the traveling unit 360, and the intake unit 330 configuring the moving robot 100, to thereby control an overall operation of the moving robot 100.

The controller 350 may process a user's voice input signal received through the microphone of the input unit 325 and perform a voice recognition process. According to an embodiment, the moving robot 100 may include a voice recognition module that performs voice recognition inside or outside the controller 350.

According to an embodiment, simple voice recognition is performed by the moving robot 100 itself, and high-level voice recognition such as natural language processing may be performed by a server.

The storage unit 305 stores various information necessary for the control of the moving robot 100, and may include a volatile or nonvolatile recording medium. The recording medium stores data that may be read by a microprocessor, and includes a hard disk drive (HDD), solid state disk (SSD), silicon disk drive (SDD), ROM, RAM, CD-ROM, magnetic tapes, floppy disks, optical data storage devices, and the like.

In addition, a map for the traveling zone may be stored in the storage unit 305. The map may be input by an external terminal, a server, or the like capable of exchanging information with the moving robot 100 through wired or wireless communication or may be created by the moving robot 100 through learning by itself.

The location of the rooms in the traveling zone may be displayed on the map. In addition, the current location of the moving robot 100 may be displayed on the map, and the current location of the moving robot 100 on the map may be updated in a traveling process. The external terminal stores the same map as the map stored in the storage unit 305.

The storage unit 305 may store cleaning history information. Such cleaning history information may be created each time cleaning is performed.

A map for the traveling zone stored in the storage unit 305, which is data storing predetermined information of the traveling zone in a predetermined format, may be a navigation map used for traveling during cleaning, a simultaneous localization and mapping (SLAM) map used for location recognition, a learning map used for learning cleaning by storing corresponding information when the moving robot collides with an obstacle or the like, a global location map used for global location recognition, an obstacle recognition map storing information regarding a recognized obstacle, and the like.

The controller 350 may include a traveling control module 351, a map creating module 352, a location recognition module 353, and an obstacle recognition module 354.

Referring to FIGS. 1 to 3, the traveling control module 351 controls traveling of the moving robot 100 and controls driving of the traveling unit 360 according to a traveling setting. In addition, the traveling control module 351 may recognize a traveling path of the moving robot 100 based on the operation of the traveling unit 360, for example. For example, the traveling control module 351 may recognize a current or past movement speed of the moving robot 100, a distance by which the moving robot 100 has traveled, and the like based on a rotational speed of the wheel unit 136, and the location of the moving robot on the map may be updated based on the recognized traveling information.

The map creating module 352 may generate a map of the traveling zone. The map creating module 352 may process an image acquired through the image acquisition unit 320 to create a map. That is, the map creating module 352 may create a cleaning map corresponding to the cleaning region.

In addition, the map creating module 352 may recognize a global location by processing an image acquired through the image acquisition unit 320 at each location and associating the processed image with a map.

The location recognition module 353 estimates and recognizes the current location. The location recognition module 353 may estimate and recognize the current location even when the location of the moving robot 100 is suddenly changed, by recognizing the location in association with the map creating module 352 using the image information from the image acquisition unit 320.

In addition, the location recognition module 353 may recognize an attribute of a region in which the moving robot is currently located. That is, the location recognition module 353 may recognize a space.

The moving robot 100 may recognize a location during continuous traveling through the location recognition module 353, and also learn a map and estimate a current location through the map creating module 352 and the obstacle recognition module 354 without the location recognition module 353.

The map creating module 352 may create a map and create a map through the image acquisition unit 320. The map creating module 352 may create a map through the sensor unit 370. The map creating module 352 may create a map based on the LiDAR data acquired through the LiDAR sensor. The map may be a grid map based on cells.

When the map is created, the controller 350 may divide regions. In dividing the map, the controller may divide the map into a first region, a second region, and a third region based on the LiDAR data. The number of regions is not limited thereto.

The first region may be an empty space according to a result of sensing by the LiDAR sensor. That is, it may be a region of a searched empty space. The second region may be a region where an obstacle exists according to a result of sensing by the LiDAR sensor. That is, it may be a region in which the searched obstacle exists. The third region may be a region not sensed by the LiDAR sensor. That is, it may be an unsearched region.

The controller 350 may perform image processing to distinguish between each region through color. The image processing may be to display colors in cells existing in each region. In this case, a gray scale may be used.

The controller 350 may maximize a difference between the color of the first region and the color of the third region. In the case of gray scale, a difference in brightness between the first region and the third region may be largest. For example, the first region may be displayed in white, the second region may be displayed in gray, and the third region may be displayed in black.

The controller 350 may display a boundary line dividing the first region and the third region. The first region and the third region may be divided through a line segment. In other words, the controller 350 may perform image processing for displaying a line segment between the first region and the third region. The controller 350 may recognize a line segment as a boundary line between the first region and the third region.

The controller 350 may recognize a boundary line and may select an optimal boundary line when the number of boundary lines is one or more. A method of selecting an optimal boundary line may use a cost function. A detailed description thereof may be referred to FIG. 7 below.

The controller 350 may plan a path to the selected optimal boundary line. In this case, whether there is a space in which the moving robot 100 will be located may be preferentially checked by creating a grid wave. The controller 350 may create a path only within a space where the grid wave reaches. Path-planning may include path creation.

This is because, if a path is created even for a case where there is no space for the moving robot 100 to be located, movement to an unnecessary space is repeated, which is inefficient in map creation.

If it is determined that there is a space for the moving robot 100 to be located through the grid wave, the controller 350 may create a path and sense an external geometry of the main body 110 through the LiDAR sensor, while moving along the path. The controller 350 may update the grid map based on the sensed LiDAR data.

When the moving robot 100 reaches the boundary between the first region and the third region and the grid map is updated through the sensor, the controller 350 recognizes another boundary line through the updated grid map and moves to the boundary line. In this case, a process of calculating an optimal boundary line may be performed.

If it is determined that the boundary line no longer exists, the controller 350 may complete the map creation.

When the map creation is completed, the controller 350 may transmit the created map to an external terminal, a server, or the like through the communication unit 390. In addition, as described above, when a map is received from an external terminal, a server, or the like, the controller 350 may store the map in the storage unit 305.

Here, in the map, the cleaning region is divided into a plurality of regions, a connection passage connecting the plurality of regions is included in the map and the map may include information on an obstacle in the region.

When a cleaning command is input, the controller 350 determines whether the location on the map and the current location of the moving robot match. The cleaning command may be input from a remote control, the input unit 325 or an external terminal.

If the current location does not match the location on the map or if the current location cannot be checked, the controller 350 may recognize the current location, restores the current location of the moving robot 100, and then controls the traveling unit 360 to move to a designated region based on the current location.

If the current location does not match the location on the map or if the current location cannot be checked, the location recognition module 353 analyzes an acquired image input from the image acquisition unit 320 to estimate the current location based on the map. In addition, the obstacle recognition module 354 or the map creating module 352 may also recognize the current location in the same way.

After recognizing the location and restoring the current location of the moving robot 100, the traveling control module 351 calculates a traveling path from the current location to the designated region and controls the traveling unit 360 to move to the designated region.

When receiving a cleaning pattern information from the server, the traveling control module 351 may divide the entire traveling zone into a plurality of regions and set one or more regions as designated regions according to the received cleaning pattern information.

In addition, the traveling control module 351 may calculate a traveling path according to the received cleaning pattern information and travel along the traveling path to perform cleaning.

When cleaning of the set designated region is completed, the controller 350 may store a cleaning record in the storage unit 305.

In addition, the controller 350 may transmit an operation state or a cleaning state of the moving robot 100 to an external terminal or server through the communication unit 390 at a predetermined cycle.

Accordingly, the external terminal displays the location of the moving robot along with the map on a screen of a running application based on the received data, and also outputs information on a cleaning state.

The moving robot 100 according to the embodiment of the present disclosure moves in one direction until an obstacle or a wall surface is sensed, and when the obstacle recognition module 354 recognizes an obstacle, the moving robot may determine a traveling pattern such as moving straight, rotation, etc. according to the properties of the recognized obstacle.

Meanwhile, the controller 350 may control to perform evasive traveling in a different pattern based on the properties of the recognized obstacle. The controller 350 may control to perform evasive traveling in different patterns according to the properties of the obstacle such as a non-hazardous obstacle (general obstacle), a dangerous obstacle, and a movable obstacle.

For example, the controller 350 may control to bypass and avoid a dangerous obstacle in a state where a safe longer distance is secured.

In addition, in the case of a movable obstacle, if the obstacle does not move even after a predetermined waiting time, the controller 350 may control to perform an evasive traveling corresponding to a general obstacle or an evasive traveling corresponding to a dangerous obstacle. Alternatively, when an evasive traveling pattern corresponding to the movable obstacle is separately set, the controller 350 may control to travel accordingly.

The moving robot 100 according to an embodiment of the present disclosure may perform obstacle recognition and avoidance based on machine learning.

The controller 350 may include the obstacle recognition module 354 that recognizes an obstacle learned through machine learning in an input image and the traveling control module 351 that controls driving of the traveling unit 360 based on the properties of the recognized obstacle.

Meanwhile, FIG. 3 illustrates an example in which a plurality of modules 351, 352, 353, and 354 are separately provided in the controller 350, but the present disclosure is not limited thereto.

For example, the location recognition module 353 and the obstacle recognition module 354 may be integrated as one recognizer and configured as one recognition module 355. In this case, a recognizer may be trained using a learning technique such as machine learning, and the trained recognizer may recognize the properties of a region, an object, etc. by classifying data input thereafter.

According to an embodiment, the map creating module 352, the location recognition module 353, and the obstacle recognition module 354 may be configured as one integrated module.

Hereinafter, an embodiment in which the location recognition module 353 and the obstacle recognition module 354 are integrated as one recognizer and configured as one recognition module 355 will be described, but even in a case where the location recognition module 353 and the obstacle recognition module 354 are separately provided, they may operate in the same way.

The moving robot 100 according to an embodiment of the present disclosure may include a recognition module 355 in which properties of objects and spaces are learned through machine learning.

Here, machine learning may refer to that a computer learns through data and solves a problem through the data even if a person does not directly instruct logic to the computer.

Deep learning refers to a method of teaching a computer about the humans' way of thinking based on artificial neural networks (ANNs) for constructing artificial intelligence, which may refer to an artificial intelligence technology that a computer may learn by itself like human beings, although human beings does not teach the computer.

The artificial neural network (ANN) may be implemented in a software form or in a hardware form such as a chip.

The recognition module 355 may include an artificial neural network (ANN) in the form of software or hardware in which the properties of space, properties of an obstacle or an object are learned.

For example, the recognition module 355 may include a deep neural network (DNN) such as a convolutional neural network (CNN), a recurrent neural network (RNN), or a deep belief network (DBN) trained through deep learning.

The recognition module 355 may determine the properties of space and an object included in image data input based on weights between nodes included in the deep neural network (DNN).

Meanwhile, the traveling control module 351 may control traveling of the traveling unit 360 based on the recognized space and the properties of an obstacle.

Meanwhile, the recognition module 355 may recognize properties of space and an obstacle included in the selected specific viewpoint image based on data learned by machine learning.

Meanwhile, the storage unit 305 may store input data for determining properties of space and an object and data for learning the deep neural network (DNN).

The storage unit 305 may store the original image acquired by the image acquisition unit 320 and extracted images obtained by extracting a predetermined region.

Further, according to an embodiment, the storage unit 305 may store weights and biases configuring the deep neural network (DNN) structure.

Alternatively, according to an embodiment, weights and biases configuring the deep neural network structure may be stored in an embedded memory of the recognition module 355.

Meanwhile, each time the image acquisition unit 320 acquires an image or extracts a partial region of an image, the recognition module 355 may perform a learning process by using a predetermined image as training data, or after a predetermined number or more images are acquired, the recognition module 355 may perform the learning process.

Alternatively, the moving robot 100 may receive data related to machine learning from the predetermined server through the communication unit 390.

In this case, the moving robot 100 may update the recognition module 355 based on the data related to machine learning received from the predetermined server.

Figure 4A:
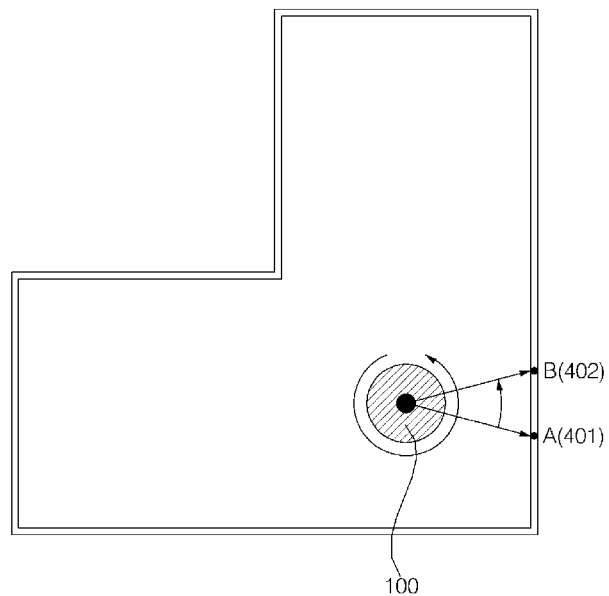
FIGS. 4A to 4B are views illustrating a grid map according to an embodiment of the present disclosure.
Figure 4B:
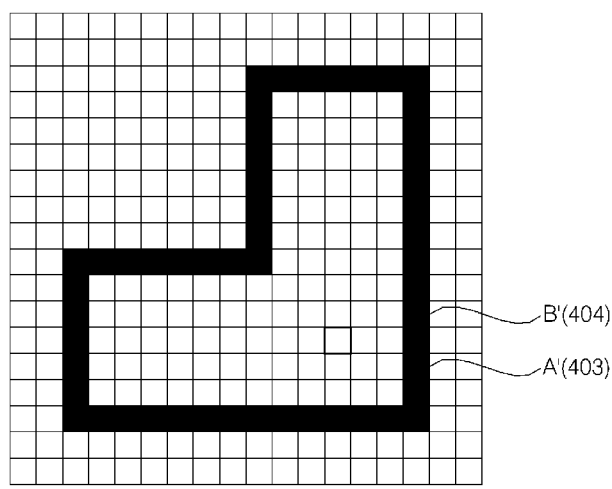

FIGS. 4A to 4B are views illustrating a grid map according to an embodiment of the present disclosure.

In order for the moving robot 100 to autonomously move and perform a task, recognition of a surrounding environment may be essential. Recognition of the surrounding environment of the moving robot 100 may be performed through a map. A typical example of such a map is a grid map in which surrounding spaces are represented by grids or cells (hereinafter, referred to as cells) having the same size and the presence or absence of objects are indicated in each cell. The moving robot 100 may create a grid map of the surrounding environment using the distance measurement sensor.

Referring to FIGS. 4A to 4B, as a typical method for the moving robot 100 to generate a grid map 400 for the surrounding environment, the robot may acquire distance information, while rotating in place and create a grid map 400 using the acquired distance information.

The grid map 400 may be a map in which a predetermined space is divided into cells having the same size and the presence or absence of an object are indicated in each cell. For example, a white cell may represent a region without an object, and a gray cell may represent a region with an object. Therefore, a line connecting the gray cells may represent a boundary line (wall, obstacle, etc.) of a certain space. A color of the cell may be changed through an image processing process.

The size of the cells may be set to be different. For example, if a length and a width of the moving robot 100 are both 50 cm, horizontal and vertical lengths of the cells may be set to 25 cm. In this case, the moving robot 100 may be located when the 2 by 2 cells are regions of an empty space. The width and length of the cell may be set to 10 cm. In this case, the moving robot 100 may be located when the 5 by 5 cells are regions of an empty space.

According to an embodiment of the present disclosure, referring to FIG. 4A, the robot 100 may be a moving robot (e.g., a cleaning robot) that creates a map of the surroundings and performs a specific task based on the created map. The moving robot 100 may include a distance measurement sensor. The measurement sensor may measure a distance to a surrounding object, create a map using the measured distance, or escape from an obstacle.

Referring to FIG. 4B, in creating the grid map 400, a specific point of a surrounding object may be indicated as gray cells 403 and 404 based on distance information. Points A(401) and B(402) sensed by the moving robot 100 with the LiDAR sensor may be represented by cells A'(403) and B'(404) in the grid map 400.

The line connecting the gray cells may represent a boundary line of a wall or an obstacle in a certain space.

Figure 5:
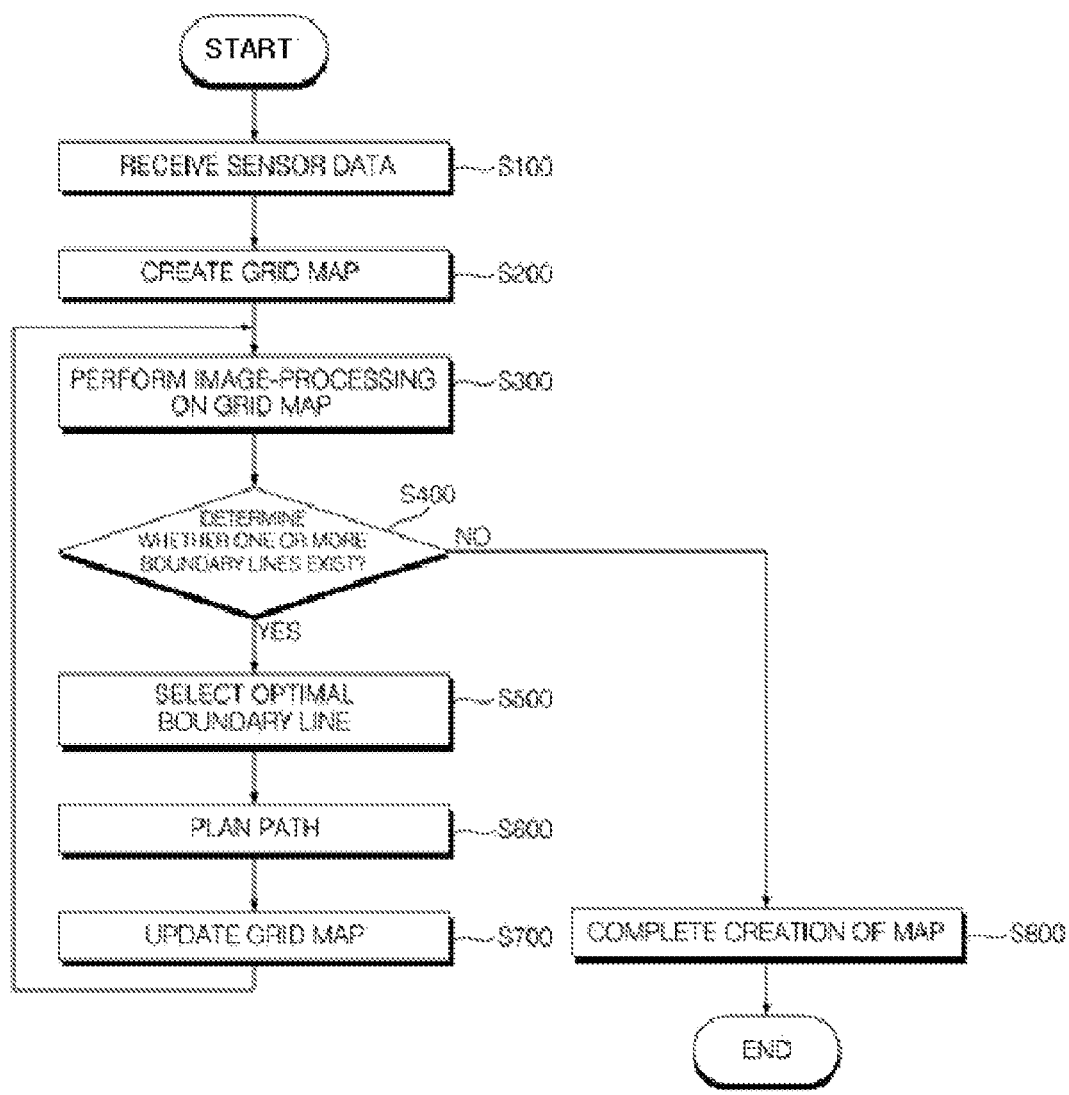
FIG. 5 is a flowchart of a method of creating a map of a moving robot according to an embodiment of the present disclosure.

FIG. 5 is a flowchart of a method of creating a map of a moving robot according to an embodiment of the present disclosure.

Referring to FIG. 5, the moving robot 100 may automatically create map through a step (S100) of receiving sensor data regarding a distance to an external object through a distance measurement sensor, a step (S200) of creating a cell-based grid map based on the sensor data, an image processing step (S300) of dividing regions in the grid map and creating a boundary line between the regions, a step (S400) of determining whether there is one or more boundary lines, a step (S500) of selecting an optimal boundary line if there are one or more boundary lines, a step (S600) of planning a path to the optimal boundary line, and a step (S700) of updating the grid map, while moving along the planned path.

In the step (S400) of determining whether there are one or more boundary lines, if one or more boundary lines do not exist, the moving robot 100 may complete the map creation (S800) and store the completed map in the storage unit 305.

The sensor data receiving step (S100) may be a process in which the controller 350 receives the LiDAR data sensed through the LiDAR sensor 175 among the distance measurement sensors. The LiDAR sensor 175 may output a laser and provide information such as a distance, a location, a direction, and a material of an object that reflects the laser, and may acquire geometry information of the traveling zone.

The LiDAR data according to an embodiment of the present disclosure may refer to information such as a distance, a location, and a direction of obstacles sensed by the LiDAR sensor 175.

In the grid map creation step (S200), a map may be generated by recognizing the LiDAR data. The map may be a cell-based grid map based on the LiDAR data. The process of creating the cell-based grid map may be understood through FIGS. 4A to 4B.

The image processing step (S300) for the grid map may include a step (S301) of dividing regions of the grid map, a step (S302) of image-processing the divided regions through colors, and an image processing step (S303) of indicating a line segment between the first region and the third region. A detailed description thereof may be referred to FIG. 7 below.

According to an embodiment of the present disclosure, the grid map is divided into a first region 701, a second region 702, and a third region 703 through the image processing step (S300) for the grid map, and the first region 701 is image-processed in white, the second region 702 is image-processed in gray, and the third region 703 is image-processed in black, and the controller 350 may recognize line segments 710, 720, and 730 between the first region and the third region as boundary lines.

In the step (S400) of determining whether one or more boundary lines exist, the number of boundary lines recognized through the line segments 710, 720, and 730 may be determined. That is, the number of image-processed line segments 710, 720, and 730 is determined.

If one or more boundary lines do not exist, the controller 350 may complete the map creation (S800) and store the map in the storage unit 305.

If there are one or more boundary lines, the step (S500) of selecting an optimal boundary line among them may be performed. The optimal boundary line may be referred to next best view (NBV).

The optimal boundary selecting step (S500) may use a cost function. The cost function is expressed by R(f) and may be calculated by Equation 1 below.

$$R(f)=a*H*I(f)-(1-a)*N(f) \quad \text{[Equation 1]}$$

Referring to Equation 1, l(f) is information cost and is a function related to environmental information (hereinafter, first information) around a boundary that may be acquired by moving to any one boundary.

l(f) may be calculated by a length of the boundary line and the number or ratio of cells in the third region. When the length l of the boundary line is long, it is likely to be a large space and the cost value may be large. If the number u of cells in the third region within a certain radius is large, the ratio of the unsearched region may be large and the cost value may be large.

That is, l(f) may be a function regarding environmental information for determining whether there is a need to preferentially search because the space around the one boundary line is large or the ratio of unsearched region is large, when moving to any one of boundary lines.

l(f) may be a weight function for the length(l) of the boundary line and the number (u) of cells in the third region within a certain radius.

$$I(f)=\omega*l(f)+(1-\omega)*u(f) \quad \text{[Equation 2]}$$

N(f) is a navigation cost and is a function of distance information (second information) from the current location of the moving robot 100 to the center point of any one boundary line. The value of N(f) may increase as the distance from the current location of the moving robot 100 to the center point of the any one boundary line is shorter.

If the cost value increases as N(f) is larger, a map may be created from a point close to the location of the current moving robot 100. From the user's point of view, it may be advantageous that N(f) is greater than a certain level. However, if N(f) is too large, there is a high possibility of searching for every corner even in a narrow space, so it may be calculated by weighting with I(f) for efficient map creation.

a refers to a weight of I(f) and N(f). In other words, the cost function is a weight function for the first information and the second information, and the cost value may be determined by a weight function for the first information and the second information. The weight may be selected by a user's input signal.

The user may weight I(f) for fast map creation to a large spatial center and may weight N(f) for map creation of every corner to a close spatial center. This principle may be applied not only to the creation of the map but also to a cleaning process.

H is a hysteresis gain and refers to a gain depending on where a boundary line is located according to a sensing range. A sensing radius of the LiDAR sensor 175 may be 11 meters.

If the boundary line is within the sensing range based on the current location of the moving robot 100, H>1, and if the boundary line is outside the sensing range, H=1. H may allow to select a boundary line in a traveling direction of the robot, thereby preventing inefficient traveling of changing directions back and forth.

Figure 7:
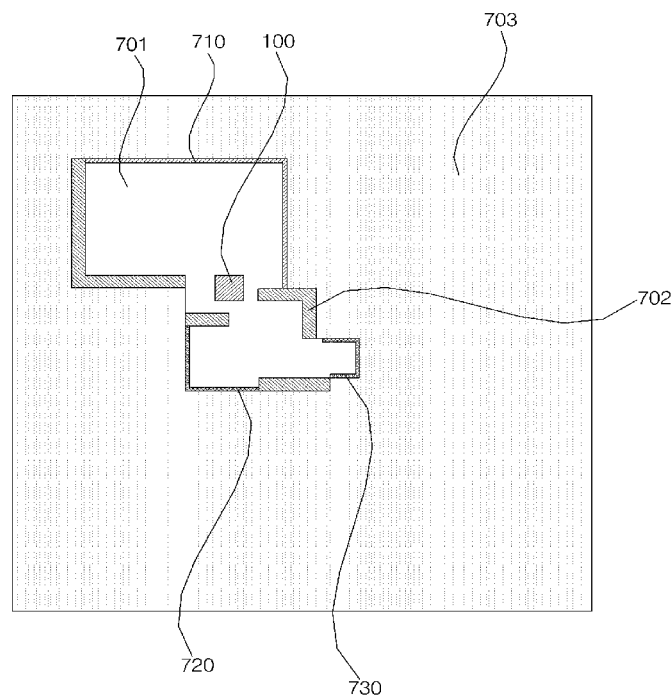

Referring to FIG. 7, through an optimal boundary line selecting step (S500), a boundary line having the largest cost value among a plurality of boundary lines may be selected. The first line segment 710, the second line segment 720, and the third line segment 730 are not illustrated but may be recognized as a first boundary line 711, a second boundary line 721, and a third boundary line 731, respectively.

A length of the first boundary line 711 may be the longest, and a length of the third boundary line 731 may be the shortest.

An optimal boundary line may be selected as the first boundary line 711 having the largest cost value among the plurality of boundary lines through a cost function. This is because if the weight of the N(f) value is not large, the length of the first boundary line 711 is the longest and the I(f) value is large.

The path planning step (S600) may be a step of planning a path to the optimal boundary line NBV. In a state where a center point of the optimal boundary line NBV is set, the path may refer to a path from the current location to the center point. Path planning may include creating a path.

The center point of the optimal boundary line NBV may be a point that bisects the length of the boundary line. The controller 350 may set a point that bisects the length of the boundary line as a center point, and create a path from the current location of the moving robot 100 to the center point.

Figure 8:
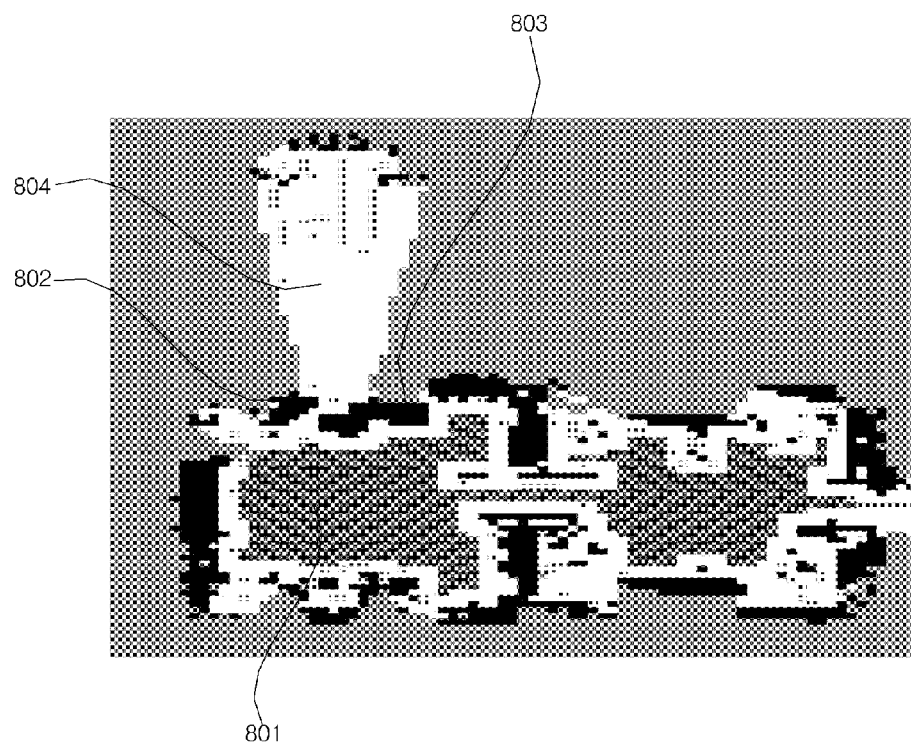
FIG. 8 is a view to help understand a grid wave creating step according to an embodiment of the present disclosure.

FIG. 8 is a view to help understand a grid wave creating step according to an embodiment of the present disclosure.

Referring to FIG. 8, the step of creating a path may further include a wave creating step of creating a grid wave 801 and preferentially checking whether there is a space in which the moving robot 100 is to be located. For example, the moving robot may emit a sound, electromagnetic radiation (e.g., emissions from a LIDAR sensor), or other wave and detect regions from a which a reflection of the wave is received or not received.

The controller 350 may determine a space where the grid wave does not reach (e.g., regions from which a reflection is received) as a space where the moving robot cannot be located, and create a path only within a space where the grid wave reaches (e.g., regions from which a reflection is received).

For example, the wave may be cut off by obstacles 802 and 803 and the grid wave 801 may not reach a first space 804. In this case, path creation in the first space may not be performed.

The controller 350 may determine the space where the grid wave does not reach as a space where the moving robot cannot be located, and may not perform the image processing step (S303) of indicating a line segment between the first region and the third region present in the space where the grid wave does not reach. That is, the controller 350 may not be able to recognize a boundary line in the space where the grid wave does not reach.

The grid map updating step (S700) may be a step of updating the grid map, while moving along the planned path. The moving robot 100 may move along the planned path to the center point of the optimal boundary line NBV, but may move up to a point before a predetermined distance. For example, the moving robot 100 may only move up to 1 meter before the center point of the optimal boundary line NBV.

The LiDAR sensor 175 may have a sensing radius of 11 meters. Therefore, moving to the end of the center point of the optimal boundary line NBV may be unnecessary work. The moving robot may move only to a point before a preset distance to reduce a movement time to perform efficient map creation.

The moving robot 100 may update the grid map based on the LiDAR data sensed while moving from the optimal boundary line NBV to the point before the preset distance.

The moving robot 100 may repeat the process of re-imaging the updated grid map, recognizing a boundary line, and selecting an optimal boundary line to update the path plan and the map.

If the moving robot 100 determines that one or more boundary lines are not recognized in the updated map, the moving robot 100 may complete the map creation and store the updated map in the storage unit 305.

Figure 6:
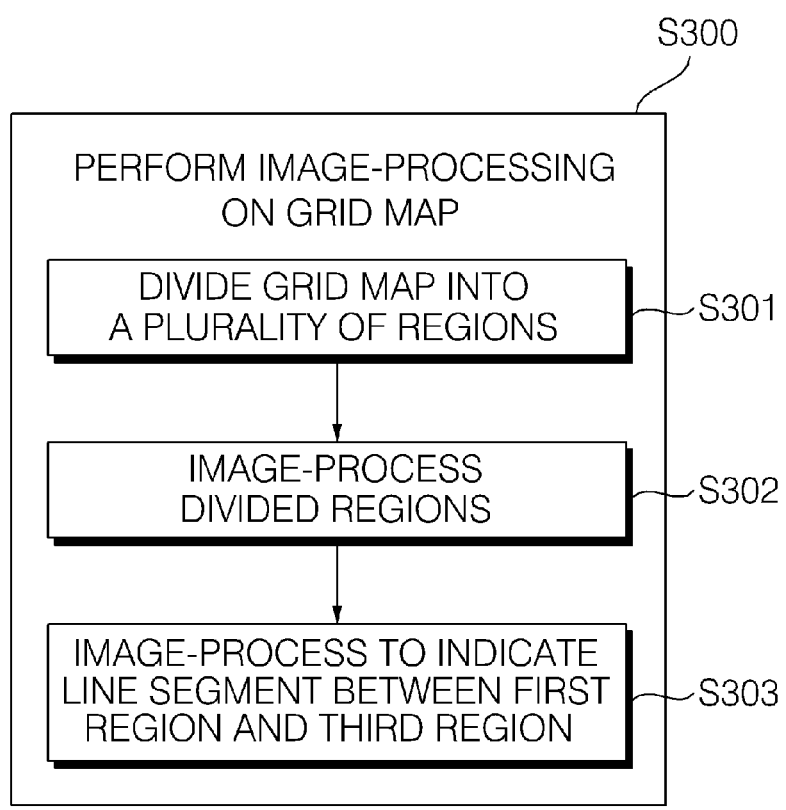
FIGS. 6 to 7 are views specifically showing an image processing step for a grid map according to an embodiment of the present disclosure.

FIGS. 6 to 7 are views specifically showing the image processing step (S300) for the grid map according to an embodiment of the present disclosure.

Referring to FIG. 6, the image processing step (S300) for the grid map may include a step (S301) of dividing regions of the grid map, a step (S302) of image-processing the divided regions by colors, and a step (S303) of image-processing through a line segment between a first region and a third region.

In the step (S301) of dividing the region of the grid map, the grid map created in the grid map creating step (S200) may be divided into a plurality of regions. The grid map may be classified into a first region 701 if a result sensed by the sensor unit 370 is an empty space, a second region 702 if a result sensed by the sensor unit 370 is a space with an obstacle, and a third region 703 if it is an unsearched space not sensed by the sensor unit 370. The regions may be more various.

The step (S302) of image-processing the divided regions by colors may be displaying the regions in different colors. The image processing may be to display colors in cells existing in each region. In this case, a color difference between the first region 701 and the third region 703 may be greater than a color difference between other regions. It may also include image processing through a difference in brightness.

For example, each region may be distinguished through a gray scale. Referring to FIG. 7, when the first region 701 is displayed in white, the second region 702 is displayed in gray, and the third region 703 is displayed in black, a difference in brightness between the first region 701 and the third region 703 may be greater than a difference in brightness between other regions.

The step (S303) of image-processing through the line segments 710, 720, and 730 between the first region 701 and the third region 703 may be a process of drawing a line segment for dividing the first region 701 and the third region 703.

Referring to FIG. 7, a total of three boundaries are formed between the first white region 701 and the third black region 703, and the image processing step (S303) of displaying line segments 710, 720, and 730 on the boundaries may be performed. The controller 350 may recognize the line segments 710, 720, and 730 as a first boundary line 711, a second boundary line 721, and a third boundary line 731, respectively.

The image processing step (S303) of indicating the line segment may further include a step of comparing the length of the boundary line and the width of the moving robot 100. If the length of the boundary line is shorter than the width of the moving robot 100, the image processing step (S303) of indicating a line segment may be omitted in the corresponding boundary line.

The image processing of indicating a line segment may be performed by extracting only a boundary line having a length longer than the width of the moving robot 100. Accordingly, a map may be efficiently created by setting only a space in which the moving robot 100 may move.

The image processing step (S303) of indicating a line segment may further include a wave creating step of creating a grid wave and determining whether there is a space for the moving robot 100 to be located.

The controller 350 may determine a space where the grid wave does not reach is a space where the moving robot cannot be located, and the boundary line of the space where the grid wave does not reach may not undergo the image processing step (S303) of indicating a line segment. Accordingly, a map may be efficiently created, while only the space in which the moving root 100 may move is searched.

FIGS. 9A to 9F are views illustrating a map creating process according to an embodiment of the present disclosure.

It can be seen that, from FIG. 9A to FIG. 9B, FIG. 9C, FIG. 9D, FIG. 9E, and FIG. 9F, a first region 901 which is a searched empty space, a second region 902 which is a space where a searched obstacle exists, and a third region 903 which is an unsearched space are changed according to the passage of time.

The first region 901 may be displayed in white, the second region 902 may be displayed in gray, and the third region 903 may be displayed in black, and the line segments F1, F2, and F3 between the first region 901 and the third region 903 may be recognized as boundary lines.

Figure 9A:
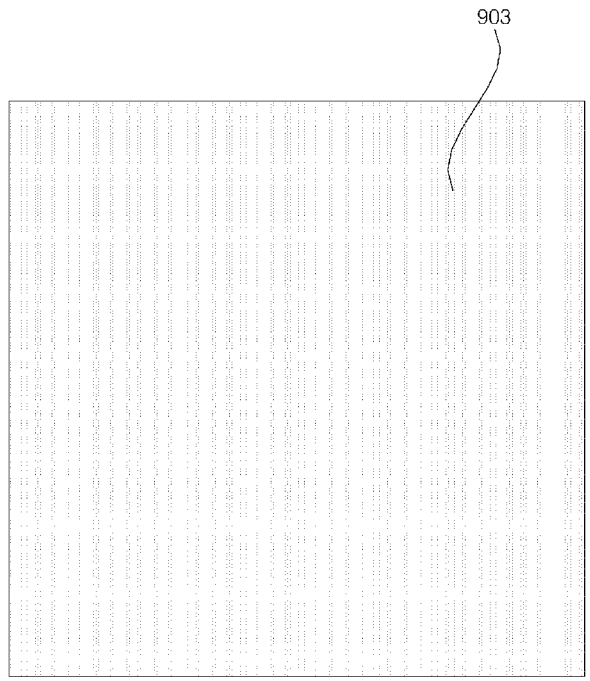
FIGS. 9A to 9F are views illustrating a map creating process according to an embodiment of the present disclosure.

FIG. 9A may show a step immediately before the moving robot 100 starts searching. Since it is before starting to sense, only the black third region 903 may exist.

Figure 9B:
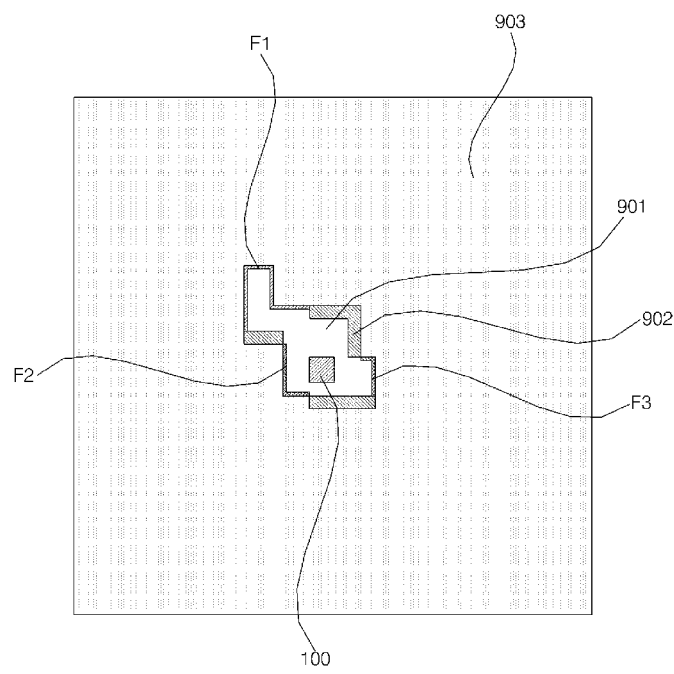

FIG. 9B may indicate a step in which the moving robot 100 starts searching. In the case of the LiDAR sensor, the sensing radius may be 11 meters. When the grid map created through the LiDAR sensor is image-processed, the zone may be divided into a first region 901 in white, a second region 902 in gray, and a third region 903 in black.

In addition, through the process of image-processing the grid map, the first boundary line F1, the second boundary line F2, and the third boundary line F3 may be recognized. The optimal boundary line NBV may be a boundary line having the highest cost value. For example, the first boundary line F1 having the longest boundary line length may be selected as an optimal boundary line.

Next, the controller 350 may plan a path to the center point of the first boundary line F1. In this case, the controller 350 may preferentially determine whether there is a space where the moving robot 100 may be located through the grid wave.

Figure 9C:
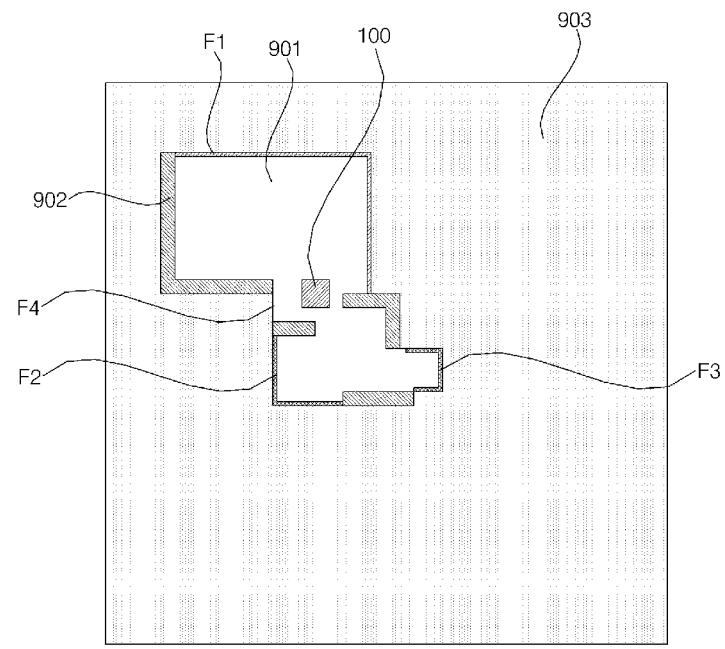

FIG. 9C may show a step in which the moving robot 100 updates the grid map based on sensed data while moving along the planned path. When the updated grid map is image-processed, the zone may be divided into a first region 901 in white, a second region 902 in gray, and a third region 903 in black.

In addition, the first boundary line F1, the second boundary line F2, and the third boundary line F3 may be recognized through the process of image-processing the grid map. In this case, a fourth boundary F4 narrower than the width of the moving robot 100 may exist between the first region 901 and the third region 903. The controller 350 may omit the image processing step (S303) of indicating the line segment in the fourth boundary F4. Therefore, the fourth boundary F4 may not be recognized as a boundary line.

The optimal boundary line (NBV) may be a boundary line having the highest cost value. For example, the first boundary line F1 having the longest boundary line length may be selected as an optimal boundary line.

Next, the controller 350 may plan a path to the center point of the first boundary line F1. In this case, the controller 350 may determine whether there is a space where the moving robot 100 may be located through the grid wave.

Figure 9D:
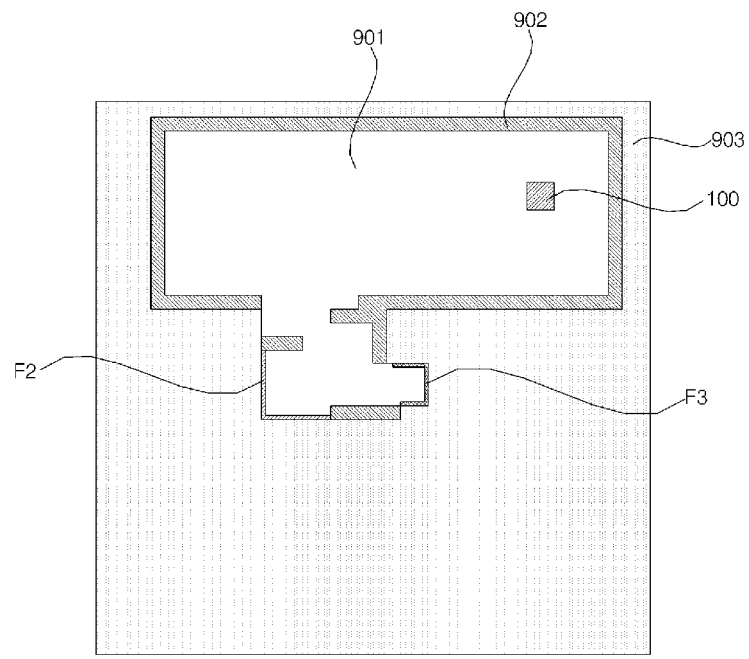

FIG. 9D may show a step of updating a grid map based on sensed data while the moving robot 100 moves along the planned path. When the updated grid map is image-processed, the zone may be divided into a first region 901 in white, a second region 902 in gray, and a third region 903 in black.

In addition, through the process of image-processing the grid map, the second boundary line F2 and the third boundary line F3 may be recognized. The optimal boundary line NBV may be a boundary line having the highest cost value. For example, the second boundary line F2 having the longest boundary line length may be selected as an optimal boundary line.

A sensing radius of the LiDAR sensor may be 11 meters. Therefore, LiDAR data may be collected up to the location of the third boundary line F3, while the moving robot moves to the center point of the second boundary line F2 through the path plan. As a result, the moving robot 100 may generate a grid map without moving to the location of the third boundary line F3 through the LiDAR sensor, and thus, a map may be efficiently created.

Next, the controller 350 may plan a path to the center point of the second boundary line F2. In this case, the controller 350 may preferentially determine whether there is a space where the moving robot 100 may be located through the grid wave.

Figure 9E:
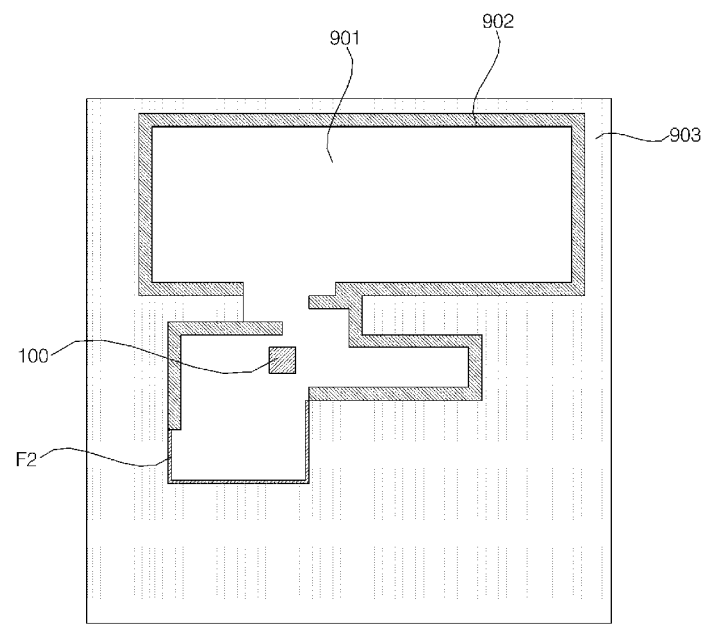

FIG. 9E may show a step in which the moving robot 100 updates a grid map based on sensed data while moving along a planned path. When the updated grid map is image-processed, the zone may be divided into a first region 901 in white, a second region 902 in gray, and a third region 903 in black.

In addition, the second boundary line F2 may be recognized through the process of image-processing the grid map. Since the second boundary line F2 is one of the boundary lines, the boundary line may be an optimal boundary line (NBV). Next, the controller 350 may plan a path to the center point of the second boundary line F2. In this case, whether there is a space in which the moving robot 100 may be located may be determined through a grid wave.

Figure 9F:
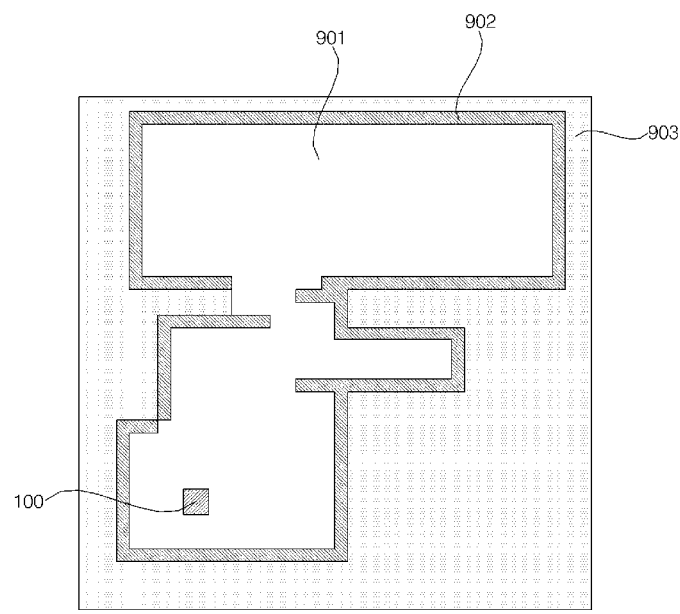

FIG. 9F may show step of completing creation of a grid map based on data sensed while the moving robot 100 moves along a planned path.

When the grid map is image-processed, the zone may be divided into a first region 901 in white, a second region 902 in gray, and a third region 903 in black. In this case, a boundary line between the first region 901 and the third region 903 may no longer exist. The controller 350 may complete the map creation and store the upgraded grid map in the storage unit 305.

The moving robot according to the present disclosure is not limited to the configuration and method of the embodiments described above, and all or some of the embodiments may be selectively combined to be configured so that various modifications may be made.

Similarly, the operations are depicted in a particular order in the drawings, but this depiction should not be understood as requiring that the operations be performed in the particular order shown or in a sequential order, or that all illustrated operations be performed, in order to achieve desirable results. In a particular case, multitasking and parallel processing may be advantageous.

The control method of a moving robot according to embodiments of the present disclosure may be implemented as codes that can be read by a processor in a recording medium that can be read by the processor. The processor-readable recording medium may include any type of recording devices in which data that can be read by the processor is stored. The processor-readable recording medium also includes implementations in the form of carrier waves, e.g., transmission via the Internet. The processor-readable recording medium may be distributed over network-connected computer systems so that processor-readable codes may be stored and executed in a distributed fashion.

Specific embodiments have been described. However, the present disclosure is not limited to the specific embodiments and various modifications may be made without departing from the scope of the present disclosure claimed in the claims, and such modifications should not be individually understood from technical concepts or prospects of the present disclosure.

According to the present disclosure, one or more of the following effects are acquired.

First, the same and accurate results are always extracted by recognizing a boundary line through image processing.

Second, since an algorithm is applied by imaging a map, any map created through any sensor may be applied regardless of map type.

Third, whether a boundary line searched through image processing is a boundary line which a robot can actually reach is determined through path planning, thus deleting a boundary line of an imaginary number to efficiently create a map of a substantially overall environment.

Fourth, when selecting an optimal boundary, a user is allowed to select a weight, thereby increasing user convenience.

The effects of the present disclosure are not limited to the above-mentioned effects, and other effects not mentioned will be clearly understood by those skilled in the art from the description of the claims.

The present disclosure provides a technique of quickly finding a boundary between a searched empty region and an unsearched region, regardless of complexity of a grid map, through image processing.

The present disclosure also provides a moving robot technology for efficiently creating a map by searching a boundary line between an unsearched region and a searched empty region and searching an optimal boundary line (next best view (NBV)) among a plurality of boundary lines and performing path planning, rather than using uncertainty of feature points.

The present disclosure is to create an occupancy grid map including probability information of an obstacle by using a light detection and ranging (LiDAR) sensor, an ultrasonic sensor, a bumper, a 3D sensor, and the like during a map creating process of a moving robot.

Technical objects to be achieved by the present disclosure are not limited to the aforementioned technical objects, and other technical objects not described above may be evidently understood by a person having ordinary skill in the art to which the present disclosure pertains from the following description.

In an aspect, a moving robot is provided. The moving robot includes: a sensor unit configured to create LiDAR data regarding an external geometry, a distance to an object, and the like through a LIDAR sensor, a traveling unit configured to move a main body, and a controller configured to create a cell-based grid map based on the LiDAR data.

In another aspect, a moving robot is provided. The moving robot includes: a controller configured to divide a grid map into a first region, a second region, and a third region, to perform image processing to create a boundary line between the first region and the third region, to recognize a boundary line, to select an optimal boundary line if there are one or more boundary lines, to perform a path plan to the optimal boundary line, and to update the grid map, while moving along a created path.

In another aspect, a moving robot is provided. The moving robot includes: a controller configured to cause colors of each region to be different such that a difference between the color of the first region and the color of the third region is largest, and to create a boundary line through image processing to indicate a line segment between the first region and the third region.

In another aspect, a moving robot is provided. The moving robot includes: a controller configured to select any one boundary line having the largest cost value as an optimal boundary line based on a cost value calculated through first information which is environment information acquired from a vicinity of any one of a plurality of boundary lines and second information which is distance information from a current location of the moving robot to the any one boundary line.

In another aspect, a moving robot is provided. The moving robot may generate a map robust to a change in an environment and accurately recognize a location on the map by complementarily using heterogeneous data acquired by utilizing a heterogeneous sensor together with a LiDAR sensor.

Details of other embodiments are included in the detailed description and drawings.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for creating a map by a moving robot, the method comprising:
    collecting sensor data by a sensor of the moving robot;
    creating a map based on the sensor data;
    performing image processing of the map to distinguish between regions in the map and to identify a plurality of boundary lines between the regions, the plurality of boundary lines having respective cost values;
    selecting a particular boundary line of the plurality of boundary lines having a largest one of the cost values;
    moving along a path to the particular boundary line; and
    updating the map based on additional sensor data collected while moving along the path,
    wherein each of the cost values is calculated based on the first information which is information regarding an environment acquired as the moving robot moves to a respective one of the boundary lines and second information which is information regarding a distance from the moving robot to the respective one of the boundary lines.

2. The method of claim 1, wherein the regions in the map that are distinguished by performing the image processing include a first region which is an empty space, a second region in which an obstacle is detected by the sensor, and a third region that has not been sensed by the sensor.

3. The method of claim 2, wherein the performing of image processing of the map includes:
    assigning a first color to the first region, a second color to the second region, and a third color to the third region, a difference between the first color of the first region and the third color of the third region being greater than differences between the second color of the second region and the first color and the third color, and
    identifying, as the boundary lines, line segments between the first region and the third region.

4. The method of claim 3, wherein the identifying of the line segments as the boundary lines includes selecting, as the line segments, a subset of line segments in the map having a length longer than a width of the moving robot.

5. The method of claim 1, wherein the cost value is determined by a weight function regarding the first information and the second information, and the weight is varied according to a user input.

6. The method of claim 1, further comprising planning the path to the particular boundary line based on identifying a center point of the particular boundary line, and determining the path from a current location of the moving robot to the center point of the particular boundary line.

7. The method of claim 6, wherein determining the path includes generating a wave, and creating the path only within a space that the wave reaches.

8. The method of claim 7, wherein the image processing is not performed in a portion of the map associated with a space that the wave does not reach.

9. The method of claim 1, wherein updating the map while moving along the path includes:
    collecting the additional sensor data while moving a preset distance from the particular boundary line.

10. The method of claim 9, wherein when moving the preset distance from the particular boundary line, another boundary line is recognized through the updated map.

11. The method of claim 1, wherein when no additional boundary line is determined in the updated map, creation of the map is completed, and the updated map is stored.

12. A moving robot for automatically generating a map, the moving robot comprising:
    a sensor configured to create sensor data regarding distances between the moving robot and at least one external object;
    a driving wheel configured to move a main body of the moving robot; and
    a controller configured to create a map based on the sensor data, wherein the controller:
        divides the map into a first region which is an empty space, a second region where an obstacle is detected, and a third region not sensed by the sensor,
        performs image processing to generate a plurality of boundary lines between the first region and the third region,
        selects a particular boundary line of the plurality of boundary lines,
        determines a path toward the particular boundary line, and
        updates the map based on sensor data collected while moving along the path toward the particular boundary line,
    wherein the controller, when selecting the particular boundary line, is further configured to:
        determine respective cost values for the plurality of boundary lines, each of the cost values being determined based on the first information which is sensed when traveling to a corresponding one of the boundary lines, and a second information which is a distance to the corresponding one of the boundary lines, and
        select, as the particular boundary line, one of the plurality of boundary lines having a highest one of the cost values.

13. The moving robot of claim 12, wherein the cost values are determined by a weight function regarding the first information and the second information, and the weight function is varied according to a user's input received by the moving robot, and
    wherein the controller calculates the cost values based on the user input.

14. The moving robot of claim 12, wherein the sensor is a light detection and ranging (LiDAR) sensor.

15. The moving robot of claim 14, wherein the controller is further configured to determine the path only within a space reached by a wave generated by the LiDAR sensor.

16. The moving robot of claim 12, wherein the controller, when determining the path to the particular boundary line, is further configured to:
- identify a center point of the particular boundary line, and
- determine the path from a current location of the moving robot to the center point of the particular boundary line.

17. The moving robot of claim 12, wherein the controller, when performing the image processing, is further configured to:
- assign a first color to the first region, a second color to the second region, and a third color to the third region, a difference between the first color of the first region and the third color of the third region being greater than differences between the second color of the second region and the first color and the third color, and
- identify, as the plurality of boundary lines, line segments between the first region and the third region.

18. The moving robot of claim 17, wherein the controller, when identifying the line segments as the plurality of boundary lines, is further to configured to select, as the line segments, a subset of line segments in the map having a length longer than a width of the moving robot.

\* \* \* \* \*